(12) United States Patent
Yemm et al.

(10) Patent No.: US 6,476,511 B1
(45) Date of Patent: Nov. 5, 2002

(54) FLOATING APPARATUS AND METHOD FOR EXTRACTING POWER FROM SEA WAVES

(75) Inventors: Richard Yemm, Edinburgh (GB); David Pizer, Glasgow (GB); Chris Retzler, London (GB)

(73) Assignee: Ocean Power Delivery Limited, Edinburgh (GB)

( * ) Notice: Subject to any disclaimer, the term of this patent is extended or adjusted under 35 U.S.C. 154(b) by 0 days.

(21) Appl. No.: 09/787,632

(22) PCT Filed: Sep. 24, 1999

(86) PCT No.: PCT/GB99/03204
§ 371 (c)(1),
(2), (4) Date: May 30, 2001

(87) PCT Pub. No.: WO00/17519
PCT Pub. Date: Mar. 30, 2000

(30) Foreign Application Priority Data

Sep. 24, 1998 (GB) ............................................. 9820704

(51) Int. Cl.⁷ ................................................. F03B 13/12
(52) U.S. Cl. ............................... 290/42; 290/53; 60/500
(58) Field of Search ........................ 290/42, 53; 60/500, 60/506; 417/332, 331

(56) References Cited

U.S. PATENT DOCUMENTS

| | | | | |
|---|---|---|---|---|
| 882,883 A | * | 3/1908 | Hillson | 60/500 |
| 917,411 A | * | 4/1909 | Casella et al. | 60/500 |
| 1,018,678 A | * | 2/1912 | Nelson | 290/4 D |
| 1,078,323 A | * | 11/1913 | Trull | 417/332 |
| 3,758,788 A | * | 9/1973 | Richeson | 290/1 R |
| 3,818,523 A | | 6/1974 | Stillman, Jr. | 442/22 |
| 4,077,213 A | | 3/1978 | Hagen | 60/500 |
| 4,098,084 A | | 7/1978 | Cockerell | 60/500 |
| 4,118,932 A | * | 10/1978 | Sivill | 417/332 |
| RE31,111 E | * | 12/1982 | Hagen | 60/50 |
| 4,392,349 A | * | 7/1983 | Hagen | 60/500 |
| 4,686,377 A | | 8/1987 | Gargos | 290/53 |
| 4,781,023 A | | 11/1988 | Gordon | 60/506 |

FOREIGN PATENT DOCUMENTS

| | | | | |
|---|---|---|---|---|
| DE | 2847750 A1 | * | 5/1980 | |
| DE | 3642060 A | * | 6/1988 | F03B/13/20 |
| DE | 4113410 A1 | * | 10/1992 | F03B/13/14 |
| DE | 4310998 A1 | * | 11/1993 | F03B/13/16 |
| DE | 4310997 A1 | * | 10/1994 | F03B/13/16 |
| FR | 2 437 507 | | 4/1980 | |
| GB | 1600360 | | 10/1981 | |
| JP | 357143168 A | * | 2/1981 | |
| RU | 1267038 A1 | * | 10/1986 | |

* cited by examiner

Primary Examiner—Joseph Waks
(74) Attorney, Agent, or Firm—Nixon Peabody LLP

(57) ABSTRACT

An apparatus for extracting power from ocean waves comprises a number of buoyant cylindrical body members (2, 3, 4) connected together at their ends to form an articulated chain-like structure (1). Each pair of adjacent cylindrical members is connected to each other by a coupling member (5a, 5b) which permits relative rotational movement of the cylindrical members about at least one transverse axis (40). Adjacent coupling members may permit relative rotation about mutually orthogonal transverse axes (A, B). Each coupling member is provided with elements such as a set of hydraulic rams (33, 34, 35) which resist and extract power from the relative rotational movement of the body members, and which can provide applied constraints to rotation about one or both of the transverse axes. The transverse axes of rotation (A, B) are skewed from the horizontal axis (104) and vertical axis (100) by a roll bias angle (ψ), selected to optimize the dynamic response of the apparatus to incoming waves. The roll bias angle (ψ) is applied by differential ballasting of the body members (2, 3, 4) and/or mooring constraints.

28 Claims, 14 Drawing Sheets

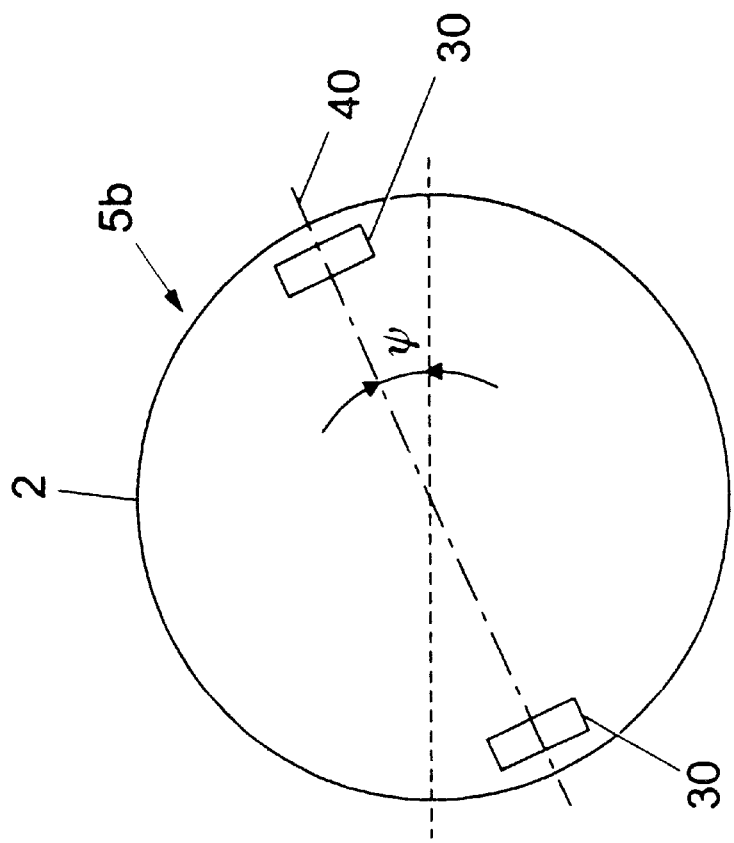
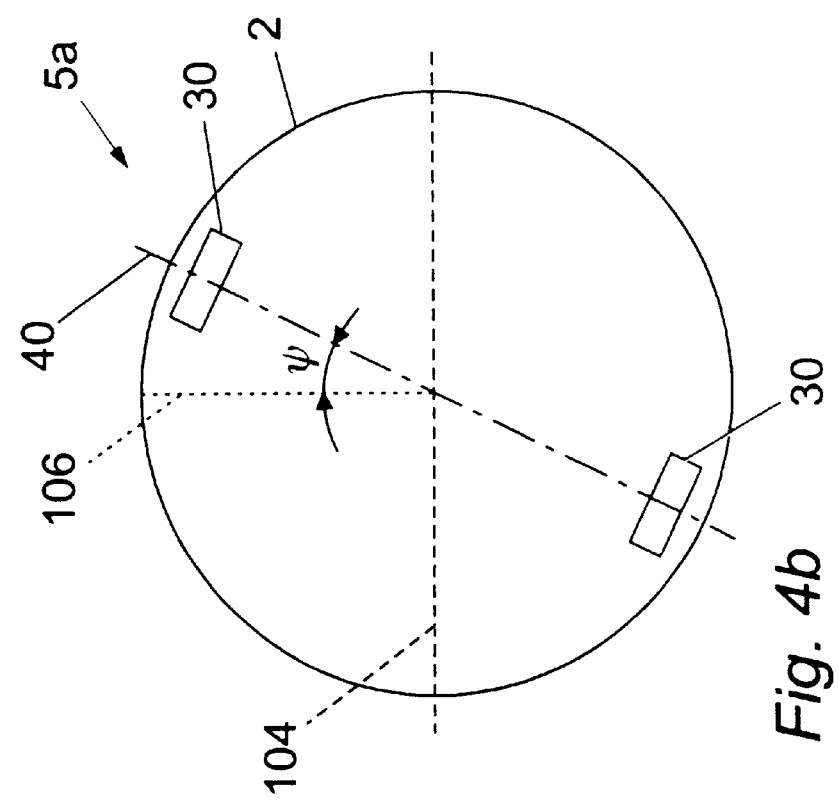
Fig. 4c
Fig. 4b

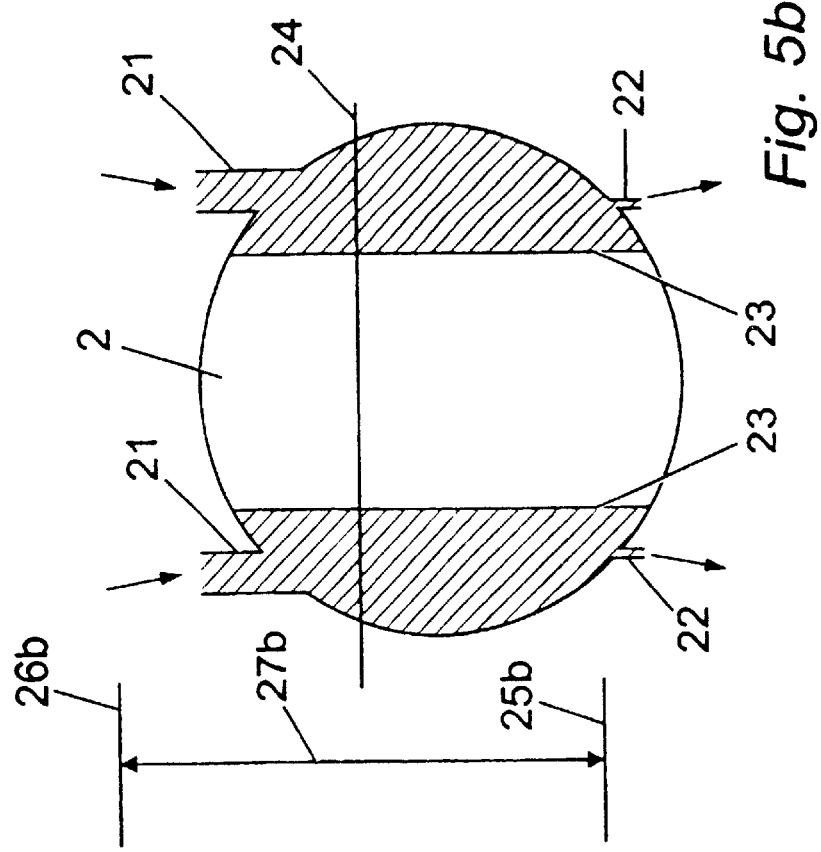
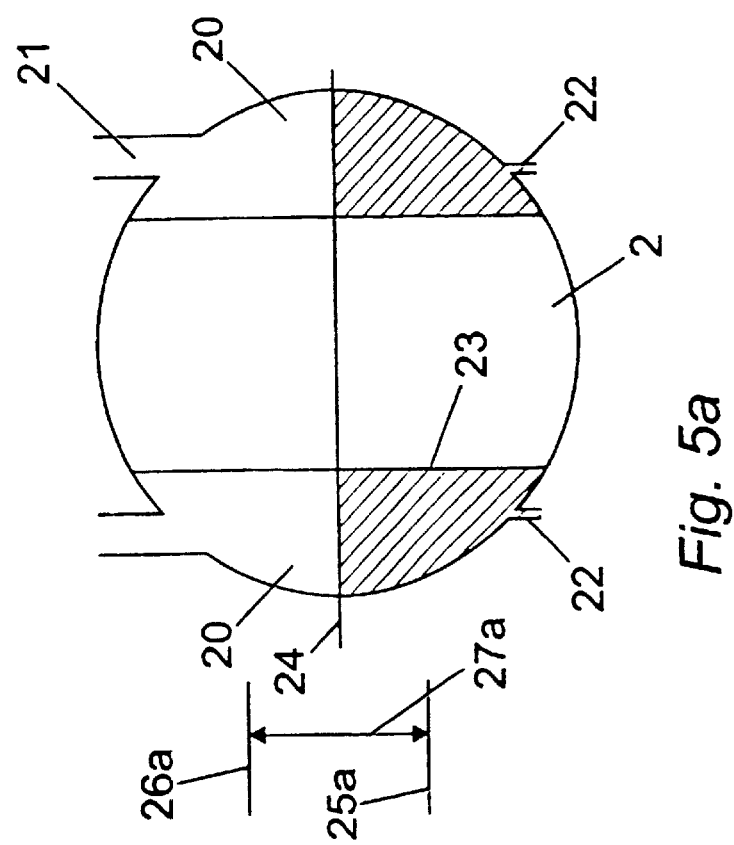

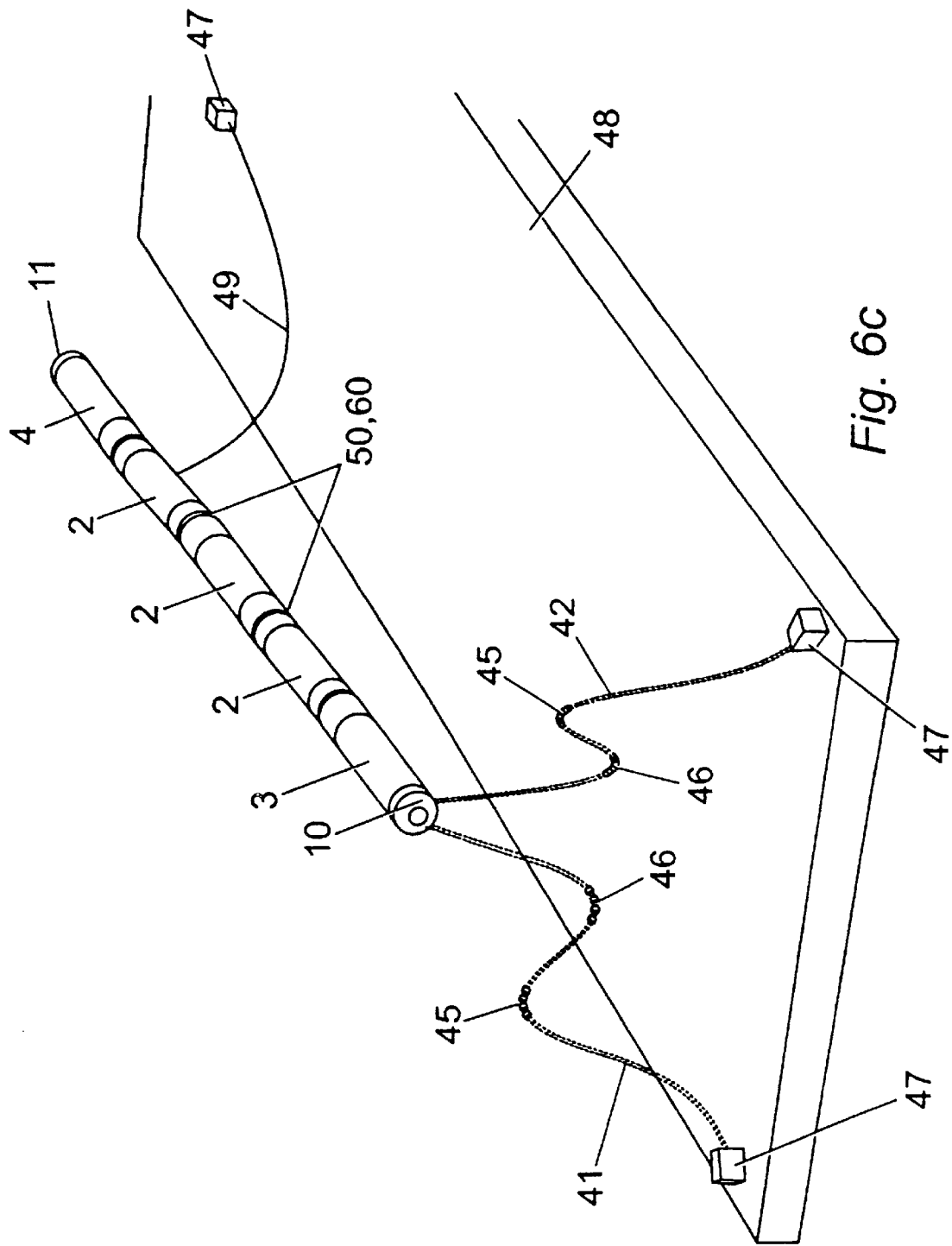

FLOATING APPARATUS AND METHOD FOR EXTRACTING POWER FROM SEA WAVES

This invention relates to an apparatus and method for extracting power from water waves, particularly ocean waves.

Ocean waves represent a significant energy resource. It is known to use a Wave Energy Converter to extract power from such waves. Known Wave Energy Converters tend to be expensive, and have limited prospects for survival in extreme conditions. It is therefore an object of the invention to provide a Wave Energy Converter which obviates or mitigates the above discussed problems by providing a Wave Energy Converter with low capital cost, and improved prospects for survival in extreme conditions, for a given power output.

According to the present invention there is provided an apparatus for extracting power from waves comprising at least two body members and a coupling member wherein the coupling member is adapted to link adjacent ends of the body members in such a way as to permit relative movement of said body members.

Preferably the apparatus comprises a plurality of body members and associated coupling members wherein said coupling members are adapted to connect adjacent ends of neighbouring body members to form an articulated structure. Said structure is typically a chain. Said chain is preferably substantially straight. Said chain may be curved. Said chain may be zig-zag.

Preferably the apparatus is adapted to be situated in waves. Typically the apparatus is adapted to react against oncoming waves to absorb power.

The chain is preferably of length comparable with the longest wavelength against which the apparatus reacts to absorb power. The chain is preferably significantly shorter than storm wavelengths.

The apparatus is preferably self-referencing. For this purpose the apparatus may be configured such that, in use, the chain is positioned to span at least two wave crests. Preferably the apparatus is configured such that, in use, the chain is free-floating slack-moored and referenced against itself.

The apparatus may further comprise a mooring system. The mooring system may position the chain in a preferred site in the ocean. Typically the mooring system is adapted to orientate the chain in a preferred orientation relative to oncoming waves.

Preferably the mooring system is adapted to orientate the chain such that it spans at least two wave crests. Typically the angle of orientation of the chain to the mean wave direction (the yaw angle) may be varied to maximise power extraction. The mooring system may be adapted to provide restraint or excitation to the apparatus for the purpose of modifying its overall response.

The body members may be of any size. The body members may be of any shape. Preferably the body members are substantially cylindrical. Typically, to limit loading, the body members have sufficiently small depth and freeboard to experience complete submergence and emergence in large waves. That is, the chain may be configured to encourage hydrostatic clipping in extreme conditions.

The cross section of said body members may be substantially elliptical or oval with the larger dimension oriented substantially horizontally to allow a larger water-plane area, while still keeping the depth and freeboard of, said member sufficiently small to permit hydrostatic clipping.

Alternatively the body members may be of arbitrary cross-section to confer other characteristics to the overall response of the device. In a preferred embodiment said cross section is wedge shaped so as to cause a lateral (perpendicular to chain axis) shift of the centre-of-buoyancy of said member as it varies its degree of submergence to alter the roll response of the system to provide improved power extraction or survival. Body members of any cross section may be provided with fins, bilge keels or other protrusions to add hydrodynamic damping to any direction of motion desired. Bilge keels may be added to influence damping of motion along the axis of the chain to influence mooring response.

The ends of the front and rear body members may be shaped to influence hydrodynamic characteristics.

Preferably the front unit may be provided with a conical front end to minimise drag in extreme seas while the rear unit has a flat rear end to increase damping along the axis of the chain structure to add damping to the mooring response.

Preferably said body members incorporate areas of sacrificial structure that will allow very large joint angles before the overall structural integrity or flotation of the member is compromised. Said areas of sacrificial structure behave in a manner similar to the crumple zone on a car.

Preferably the coupling members are single degree of freedom joints. Alternatively the coupling members may be universal joints.

Preferably the joints are orientated in varying directions. More preferably each joint is orientated substantially orthogonal to an adjacent joint and substantially perpendicular to the main longitudinal axis of the chain structure.

The apparatus is preferably configured to apply a roll angle away from horizontal and vertical (a roll bias angle) to the joints of the chain. Said roll bias angle may be different for each pair of joints. Said roll bias angle may be varied to maximise power extraction. The purpose of the roll bias angle is to ensure that the apparatus is orientated at an angle such that its mode of motion in the orientation at that angle is resonant with incoming waves.

Typically the apparatus comprises elements adapted to resist the relative movement of said body members. Said elements may be adapted to extract power from said relative movement. Said elements may be springs. Additionally or alternatively said elements may be power extraction systems. Different magnitudes of constraint may be applied to the substantially perpendicular pairs of joints in order to induce a cross-coupled response. The ratio of the magnitudes of constraint may be used to increase power capture in small waves.

Typically the apparatus is configured such that its capacity to absorb power is controlled by the orientation of the joints and the differential restraint thereof.

The chain may be adapted to be buoyant. More preferably the chain is adapted to be essentially free floating.

The apparatus may be provided with a ballasting system. Said system may be variable. Said system may be actively or passively variable. Typically said variable ballasting system comprises ballast tanks comprising inlet means and outlet means, wherein said inlet means is larger than said outlet means.

Said variable ballasting system may be confined to a front unit or units of the chain so as, in use, to encourage the front of the chain to dive under large wave crests. Said variable ballasting system may act to vary the roll bias angle of the chain, for example by the provision of asymmetric ballasting.

Preferably the arrangement of the body members and joints which comprise the chain is adapted to suit a specific site. Preferably the length of the chain is determined by the wavelength expected at a specific site. More preferably the length of individual body members which comprise the chain is determined by the wavelength expected at a specific site.

Typically the apparatus is configured to maximise its capacity to extract power from a given sea state, but also to ensure survival in extreme conditions. More preferably the apparatus is configured to be effective at reacting only against waves of wavelength below a designated length.

Preferably the apparatus is adapted directly to convert the power absorbed from the motion of adjacent segments into electricity. Alternatively the apparatus may be adapted to tore the power absorbed for future use.

Further according to the present invention there is provided a method or extracting power from waves comprising the steps of:

deploying an apparatus comprising a chain comprising a plurality of body members coupled with joints orientated in different directions in such a way as to permit relative movement of said body members in waves;

orientating the chain'such that it spans at least two wave crests;

applying a roll bias angle to said joints;

applying different constraints to each direction to induce a cross-coupled response;

tuning said response to control power absorption; and extracting the power absorbed.

Embodiments of the invention will now be described by way of example only with reference to the accompanying drawings in which:

FIG. 4b illustrates the roll bias angle ($\psi$) with reference to a sway joint;

FIG. 4c illustrates the roll bias angle ($\psi$) with reference to a heave joint;

FIG. 5a is a schematic diagram showing the operation of the passive variable ballasting system of the apparatus in waves of small amplitude;

FIG. 5b is a schematic diagram showing the operation of the passive variable ballasting system of the apparatus in waves of large amplitude;

FIG. 6c is a perspective view of an embodiment of the apparatus comprising two-degree-of-freedom joints in situ;

FIG. 8b is a cut-away view of the embodiment of FIG. 8a;

FIG. 9b is a cut-away view of the embodiment of, FIG. 9a;

Figure 1:
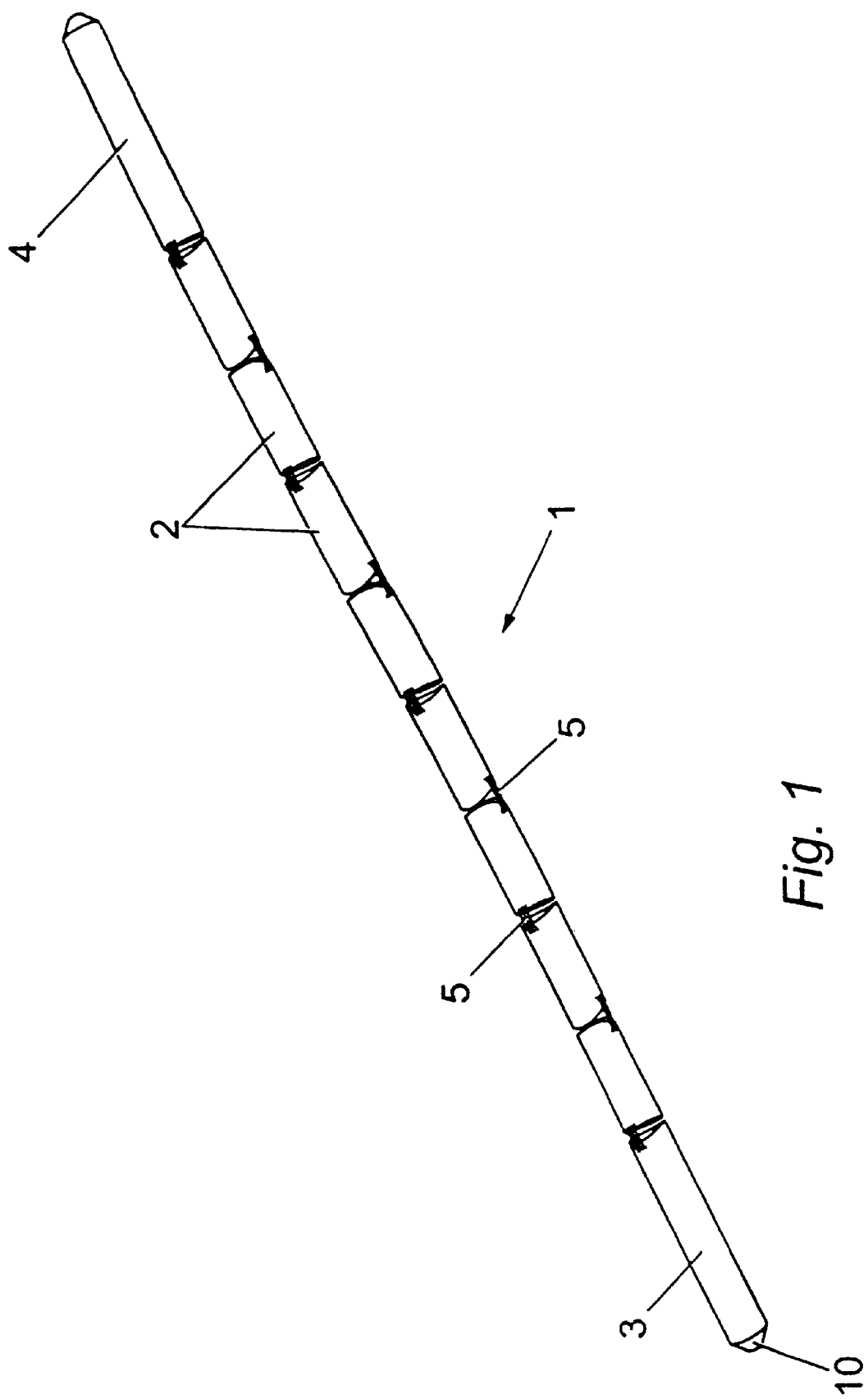
FIG. 1 shows an overall view of the apparatus of the present invention deployed in waves.

Referring to the drawings, an apparatus 1 for extracting power from waves comprises a wave energy converter having two or more body members 2, 3, 4. The configuration of a particular converter 1, that is the number, size and shape of the body members 2, 3, 4 of which it is comprised, is determined by the annual wave climate of the locality for which it is destined, and thus by the conditions it is likely to encounter. That is, each converter is designed to be site specific.

The body members 2, 3, 4 are connected by hinges or universal joints 5 to form an articulated chain. The chain resembles a spine structure. The relative movements of the body members 2, 3, 4 are resisted by elements which extract power from this relative motion. The converter is buoyant and essentially free floating. In use, the converter is typically semi-submerged though different depths of submergence can be used to optimise power capture and/or survivability.

The converter is referenced predominantly against itself rather than against the shore or the seabed. This self referencing is achieved by the converter being of length comparable to the incident wavelength, and the converter being orientated relative to incident waves in a direction such that the converter spans at least two crests of the incident waves.

The configuration and orientation of individual joints, and the type and rating of individual power extraction elements which comprise a particular apparatus, are selected to maximise the power extracted from a given sea state, but to ensure survival in extreme conditions. In particular an overall roll bias angle ($\psi$) is applied to the joint axes away from horizontal and vertical to generate a cross coupling of the heave and sway motions of the converter in response to wave forces.

The same selection criteria determine the preferred orientation in relation to incident waves of the complete apparatus, when deployed.

Thus maximum power absorption by, and thus maximum power output from the apparatus is achieved by coupling its body members using joints orientated in different directions, by applying the roll bias angle ($\psi$) to the joints, by applying different constraints to each direction to induce a cross-coupled response of varying magnitude and form which may be tuned to suit the wave conditions, and by using a system of moorings to present the converter in a preferred orientation relative to incoming waves.

The mooring system may also provide significant physical restraint or excitation to the converter so as to modify the overall response. Power may be extracted directly or indirectly by converting the motion of adjacent segments into electricity, or by using the absorbed power to produce a useful byproduct.

Figure 2:
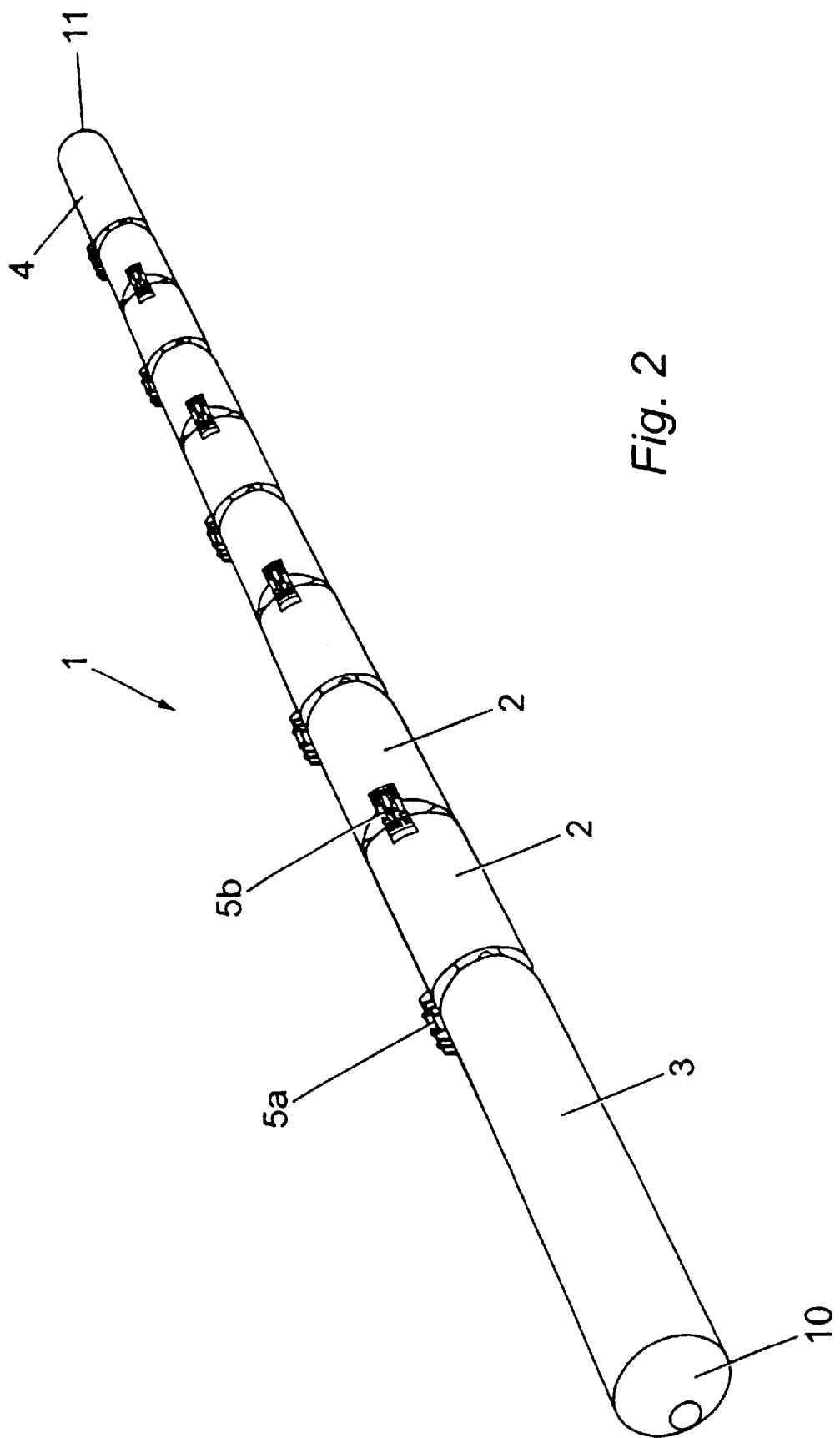
FIG. 2 shows the apparatus of FIG. 1.

FIGS. 1 and 2 show a particular embodiment of an apparatus according to the invention. In this embodiment the converter comprises a number of body members in the form of cylindrical segments 2 linked to form a chain structure 1.

Each segment 2, 3, 4 is of the same diameter. With the exception of the end segments 3, 4, the segments 2 are of equal length. Each of the end segments 3, 4 is approximately twice as long as the intermediate segments 2.

Although the segments shown in FIGS. 1 and 2 have a circular cross-section, it is to be understood that the cross section of the body members may be substantially elliptical or oval with the larger dimension oriented substantially horizontally to allow a larger water-plane area, while still keeping the depth and free-board of the member sufficiently small to permit hydrostatic clipping.

Alternatively the body members may be of arbitrary cross-section to confer other characteristics to the overall response of the apparatus. In one embodiment the cross-section is wedge shaped so as to cause a lateral (perpendicular to chain axis) shift of the centre-of-buoyancy of the body member as it varies its degree of submergence to alter the roll response of the apparatus to provide improved power extraction or survival.

Body members of any cross section can optionally comprise fins, bilge keels or other protrusions to add hydrodynamic damping to any direction of motion desired, to influence the device and/or mooring response.

The ends of the front 3 and rear 4 segments may be shaped to influence hydrodynamic characteristics. The front segment is optionally provided with a conical front end 10 to minimise drag in extreme seas, while the rear segment 4 has a flat rear end 11 to increase damping along the axis of the chain structure to add damping to the mooring response.

Figure 11A:
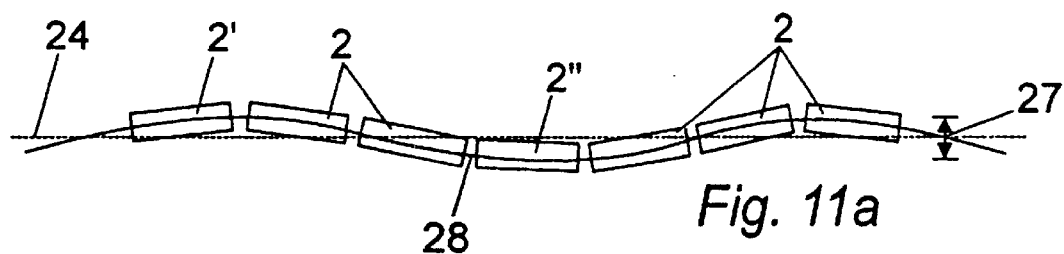
FIGS. 11A–11C are schematic diagrams showing the hydrostatic clipping operation of the apparatus in waves of increasing amplitude.
Figure 11B:
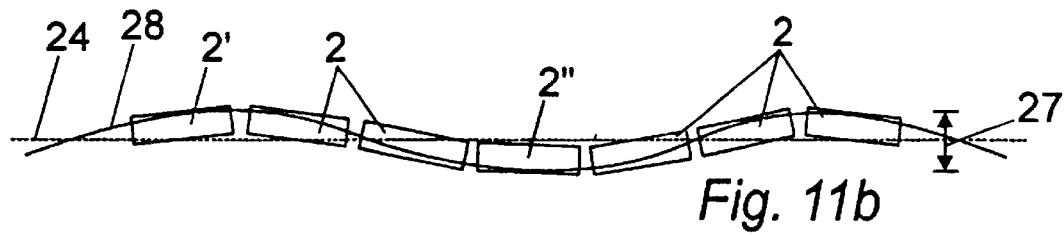
Figure 11C:
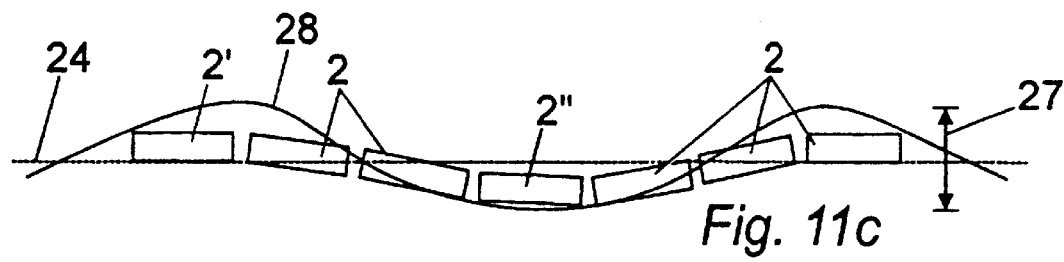

The structure 1 is designed to survive in extreme conditions. One factor which influences survival is the size of the individual segments 2, 3, 4. The size of the segments 2, 3, 4 is selected to be small with respect to the maximum expected wave height in an area where the structure 1 will be deployed. In the situation where the segments 2, 3, 4 are small with respect to the wave height, —for example in storm conditions—there is thus complete local submergence or emergence of the converter, a situation known as 'hydrostatic clipping'. This clipping limits the magnitude of forces and bending moments to which the structure of the converter is subjected in such adverse weather conditions, and increases the chances of survival of the structure 1. Hydrostatic clipping is shown in FIG. 11, which shows segments 2 of an apparatus of the invention in three sea states compared to mean horizontal water level 24. In waves of small amplitude 27, as in FIG. 11(a), the segments 2 adopt the shape of the wave profile 28, and the segment 2" near the wave trough is submerged as deeply as the segment 2' near the wave peak. In waves of increasing intermediate amplitude 27, as in FIG. 11(b), the segments 2 adopt a flattened profile compared to the wave profile 28, and the segment 2" near the wave trough is submerged only slightly, while segment 2" near the wave peak is nearly fully submerged. In waves of large amplitude 27, as in FIG. 11(c), the segments 2 adopt a significantly flattened profile compared to the wave profile 28, and the segment 2" near the wave trough is raised out of the water, while segment 2" near the wave peak is totally submerged.

In calm weather, where wavelengths are relatively short, and wave amplitudes are small, there is a requirement to maximise power absorption by the converter.

In extreme weather, where wavelengths are longer and wave amplitudes are larger, survival of the converter is of greater importance than power absorption efficiency.

Figure 10A:
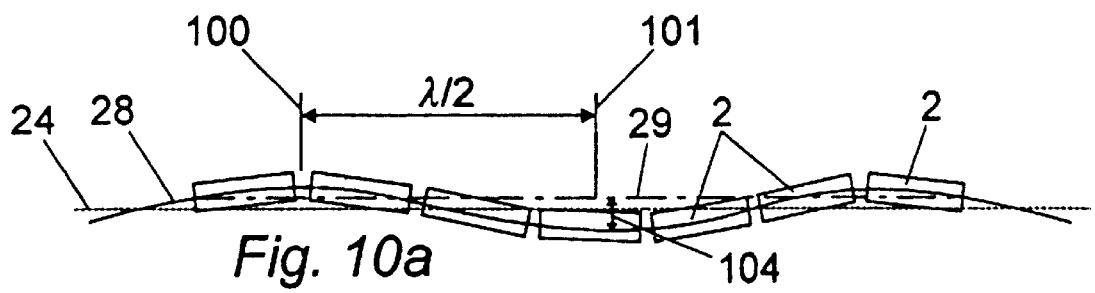
FIGS. 10A–10B are schematic diagrams showing the self-referencing operation of the apparatus in waves of small and large wavelength.
Figure 10B:
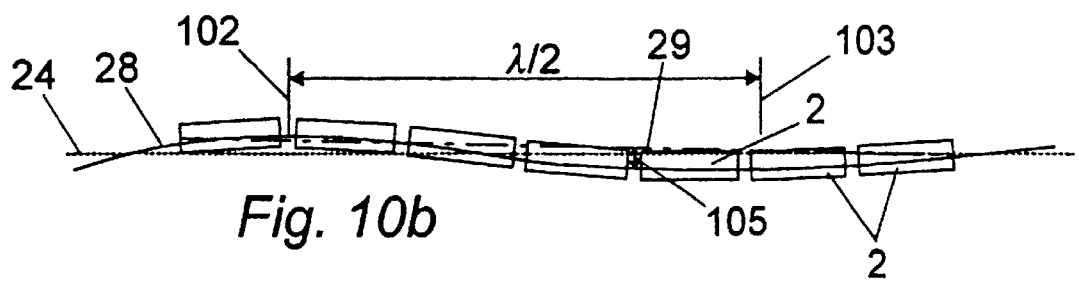

The total length of the assembled structure 1 is therefore selected to be sufficiently long to provide adequate self referencing of the structure 1 in short wavelengths where not much power is available and there is a requirement to maximise power absorption, and sufficiently short to 'hide' in long wavelengths associated with storm waves in order to survive. If the wavelength is much greater than the length of the structure, then the structure cannot extend from peak to peak, and the maximum movement of any part of the structure relative to any other part is less than the amplitude of the wave, so that the structure 'hides' in the long wavelength. In other words, the structure loses the ability to reference itself against the wavelength. This effect is illustrated in FIG. 10, which segments 2 of a structure of the invention in two wave profiles 28 of differing wavelength compared to mean horizontal water level 24. The wavelength $\lambda$ is the distance between adjacent wave crests The line 29 joins the ends of the structure, and so the movement of any segment 2 of the structure relative to the mean instantaneous position of the structure is represented by the distance of the centre of the segment from the line 29. In FIG. 10(a) the wavelength is small and the half wavelength $\lambda/2$ is the distance between crest 100 and trough 101. The maximum movement of any segment 2 of the structure relative to the mean instantaneous position of the structure is shown by arrow. Both the maximum movement 104 and, the mean movement in FIG. 10(a) are greater than the maximum movement 105 and the mean movement in FIG. 10(b), in which the wave amplitude is the same, the wavelength is large and the half wavelength $\lambda/2$ is the distance between crest 102 and trough 103.

Durability and cost of the segments 2, 3, 4, and of the structure 1 as a whole are important design considerations. For this reason, the preferred material for the converter is reinforced concrete. Other materials such as steel are preferred alternatives. However any suitable construction material or materials may be used.

Figure 4A:
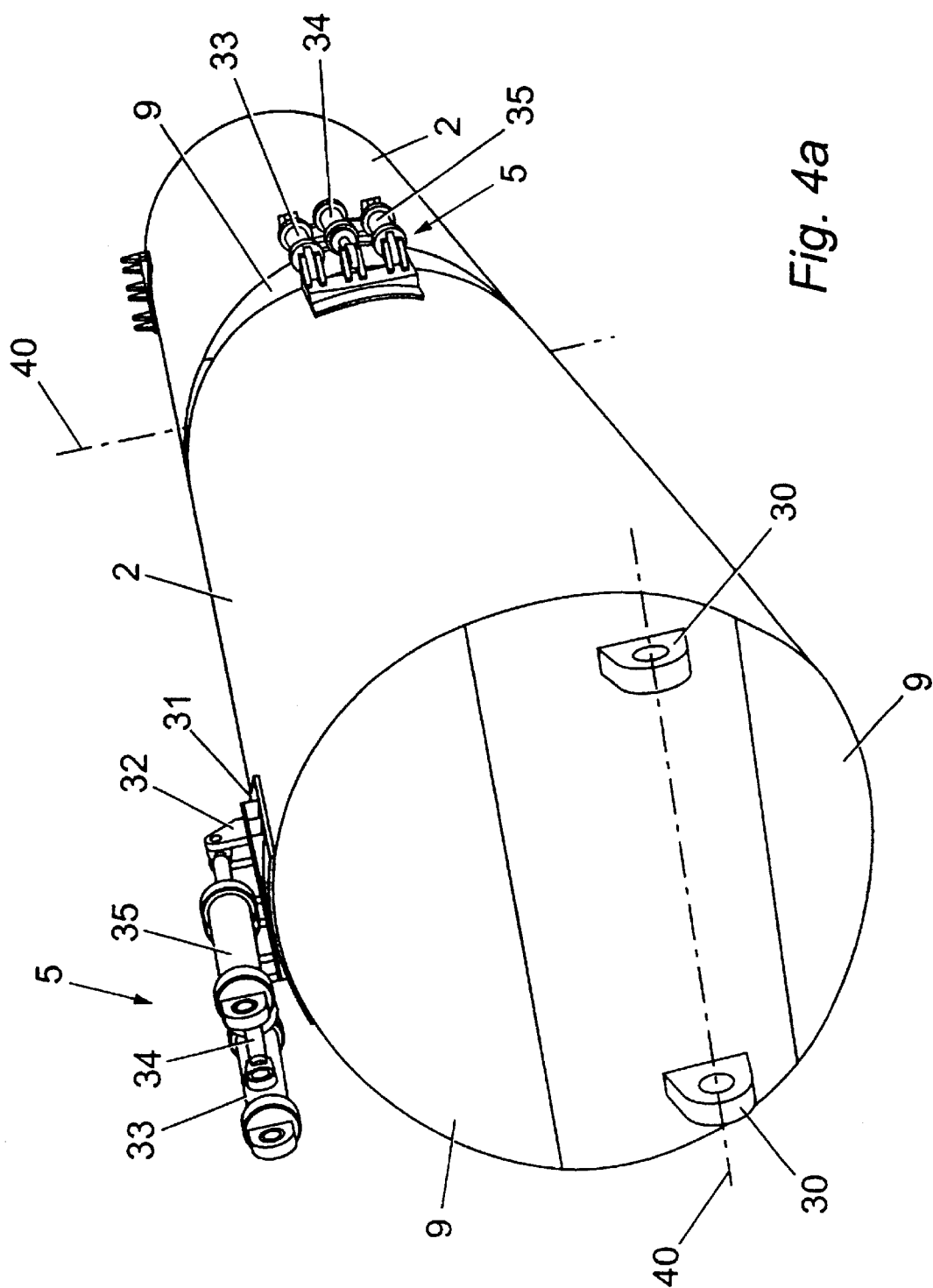
FIG. 4a shows a detail of the apparatus illustrating the relative orientation of neighbouring joints.

Single degree-of-freedom joints (hinges) 5 link adjacent segments 2, 3, 4 of the structure 1 which comprises the structure 1. The joints 5 are of alternating sense. That is, heave joints 5a are alternated with sway joints 5b along the length of the structure. Alternatively, one or each joint may be a combined heave and sway joint. In this embodiment, the joints attaching the end segments 3, 4 are heave joints 5a. At rest, the structure 1 is straight. As shown in FIGS. 2 and 4a, each joint 5 is attached to a segment 2 with its axis approximately orthogonal to the joint on either side, Thus adjacent joints 5a, 5b are orientated approximately orthogonal with respect to each other. The joints may be alternatively be positioned with relative angles other than 90 degrees if a particular situation dictates.

The passage of waves causes the structure to flex about each of the joints 5.

In a preferred embodiment the structure 1 is ballasted to float with its centre-line on the water-plane (approximately 50% displacement). That is, in use, the structure 1 is semi-submerged.

The structure 1 is ballasted or moored so as to apply an overall roll bias angle ($\psi$) to the joint axes 40 away from horizontal axis 104 and vertical axis 106, as shown in FIGS. 4b and 4c. This angle ($\psi$) may be common to all joints 5 in the structure 1 or may vary along its length. The roll bias angle ($\psi$) is utilised to generate a cross-coupling of the heave and sway motions experienced by the structure 1 in response to wave forces.

The converter is optionally provided with an active or passive ballasting system which varies the level at which the individual segments or the complete structure floats. If incorporated, the ballast system is capable of being disabled. Alternatively the ballasting system is removable and replaceable. This ballasting system hastens the onset of hydrostatic clipping in extreme seas, thus helping to minimise the maximum loads and bending moments to which the structure is subject in adverse weather conditions.

This variable ballasting system is shown in FIGS. 5a and 5b, and comprises ballast tanks 20 bounded by internal bulkheads 23 and provided with large inlets 21. The wave amplitude 27a, 27b is measured between the maximum wave level 26a, 26b and the minimum wave level 25a, 25b. The large inlets 21 allow rapid filling of the tanks 20 as wave amplitude increases from a small amplitude 27a, as shown in FIG. 5a, to a large amplitude 27b, as is shown in FIG. 5b. Above a certain amplitude the upper wave level 26a, 26b tops the large inlet 21 and fills the ballast tank 20. The ballast tanks 20, are further provided with drains 22 at the bottom of the tanks. These drains 22 are small relative to the inlets 21 to allow only slow emptying of the tanks.

Inclusion of the variable ballasting system provides an advantage in large waves. In large waves, rapid filling of the tanks 20 increases the displacement of the structure 1. The increased displacement causes the structure 1 to float lower in the water relative to the mean water level 24, as illustrated in FIGS. 5a & 5b. This ballasting system thus contributes to hastening local submergence of the structure 1 in large wave amplitudes, and is thus load limiting in such conditions.

The variable ballasting system may be situated in all segments 2, 3, 4, or in selected segments. In one embodiment the system is incorporated in the lead (the 'front' or 'upwave') segment 3 of the converter 2. This encourages submergence of the front of the structure 1 in large waves, allowing large wave crests to pass over the whole converter, analogous to surfers diving under breaking wave crests when swimming from the beach.

The ballast tanks 20 of the ballasting system are optionally positioned asymmetrically (not shown) in the structure 1. This asymmetric arrangement acts to affect the magnitude of the roll bias angle ($\psi$) as previously defined. Varying the roll bias angle ($\psi$) influences the magnitude of the coupled, self excited response. The ballasting system may therefore be used in conjunction with the mooring system to vary the overall roll bias angle ($\psi$). The roll bias angle ($\psi$) is selected to achieve the maximum coupled response of the converter around the frequency of interest. Criteria which influence the selection of the roll bias angle include ($\psi$) the dimensions of the converter, namely its length and its diameter; the mean wave period at the site where the converter is to be deployed; and the nature of the power extraction elements applied at the joints. The optimum roll bias angle ($\psi$) for a set of given criteria is determined by a computer program tailored for this purpose. The roll bias angle ($\psi$) is reduced as the wave period lengthens. The roll bias angle ($\psi$) applied increases with the size of the converter. As an example, for a converter of diameter 3.5 m and of length 132 m, deployed in seas with a wave period of 10 s, the optimum roll bias angle ($\psi$) is around 25 degrees.

Additionally or alternatively the converter includes an active system to control the roll bias angle ($\psi$). In this way the active control system also controls the response of the converter in waves.

Each end face 9 of the intermediate segments 2, and the inner end faces 9 of the end segments 3, 4 are chamfered to allow clearance for extreme joint motion. The chamfered portions lie on planes intersecting the joint axis in order that opposing faces 9 meet to form a cushioning squeeze film. In the event that end-stops are reached this has the effect of reducing impact load.

The front end 10 of the structure 1 is conical. This has the effect of reducing slamming loads in extreme waves. The rear end 11 may be conical or flat.

The converter is adapted to allow the characteristics of individual joints 5 to be varied as required. For this purpose, elements such as springs and/or power extraction systems are applied to some or all of the joints 5. These elements restrain or excite the motion of the joint 5.

If the elements apply identical restraint or excitation to each joint 5, the overall response of the converter is largely unaffected by the roll bias angle ($\psi$).

If the elements apply differing restraint or excitation to each joint, this can be used in small waves to generate a coupled, self exciting response which greatly increases the power absorbed. Alternatively this can be used in extreme conditions to minimise loads and motions and to contribute to survivability in such conditions.

One embodiment of the invention has alternating single degree-of-freedom joints 5 which allow the restraining/exciting elements to control motions in various directions. An alternative embodiment employs omni degree-of-freedom joints (universal joints) with the restraining/exciting elements arranged around them.

Figure 3:
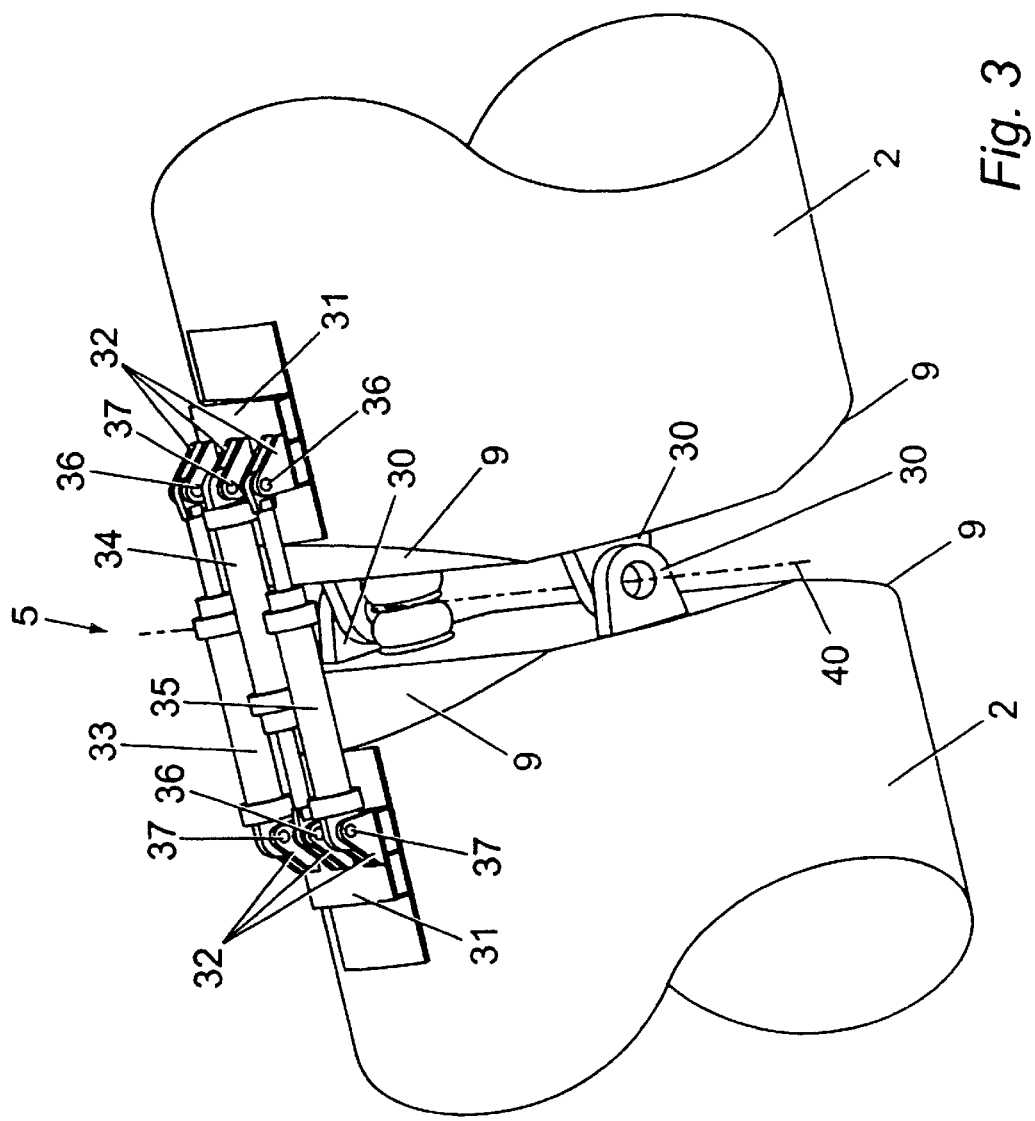
FIG. 3 shows a detail of a joint of the apparatus of FIG. 1.

A typical single degree-of-freedom joint 5 is illustrated in FIG. 3. Two adjacent single degree-of-freedom joints 5 are shown in FIG. 4a. In this embodiment each joint 5 has a independent hydraulic system allowing individual joint characteristics to be varied as required. For this purpose each joint is controlled by three double acting hydraulic rams 33, 34, 35. Each end face of the adjacent units is provided with a pair of bearing blocks 30, through which a pin (not shown) passes to form a hinged connection. A reinforced ram mounting pad 31 is secured to each segment, on a radial axis perpendicular to the axis 40 of the pin. Three ram mounting blocks 32 are secured to each mounting pad. The rams 33, 34, 35 are mounted between opposing mounting blocks 32. The rams 33, 34, 35 are all sited to sit above the still water line when the structure is deployed, for ease of access and ease of maintenance. The rams 33, 34, 35 can be positioned on either or both sides of the hinge line. In the embodiment of FIG. 3 the segments 2 are connected by external in-line rams.

The hydraulic rams 33, 34, 35 provide spring and damping reaction moments between the segments 2, 3, 4. A first ram 34 is coupled to gas accumulators to form a hydraulic spring system, and can be operated to apply a spring force to a joint 5. A further pair of rams 33, 35 are configured as double acting pumps having inlet and outlet valves. This pair of rams 33, 35 may be operated to apply a damping force to a joint 5.

The inlet valves of the two damping rams 33, 35 are selectively operable. This means that either or both damping rams 33, 25 may be enabled or disabled, allowing the restraint to be varied in response to the prevailing sea-state. A wide range of damping levels may be obtained by selecting or deselecting a ram 33, 25, and by altering the system pressure level.

The damping rams 33, 35 are arranged opposite each other. Such an arrangement prevents asymmetry in the loads applied by the rams 33, 35 due to the difference in effective piston area caused by the piston rod.

The ram diameters, and moment arm through which they act on a joint 5 are selected for a particular structure 1 to apply the desired restraint to the joint 5 for the particular conditions the structure 1 is tailored to encounter. In addition, the maximum joint angle the converter 1 is expected to encounter is calculated, and the stroke of the rams 33, 34, 35 is selected to be greater than this angle.

When the calculated maximum expected joint angle is exceeded, the converter has the in-built safety feature that each of the rams 33, 34, 35 is designed to detach from its rod end connection 36 whilst remaining attached at the cylinder end connection 37. This prevents rupture of the hydraulic hoses (not shown) connected to the ram cylinders and thus prevents spillage of hydraulic fluid into the environment. The fact that the rams 33, 34, 35 have different endstops and detach successively rather than simultaneously prevents the converter being subject to extreme loading moments, and prevents damage of the segments 2, 3, 4.

Each end of the segment 2 is provided with a chamfered end 9, to allow maximum relative movement of the segments 2 about the pin axis 40.

Figure 8A:
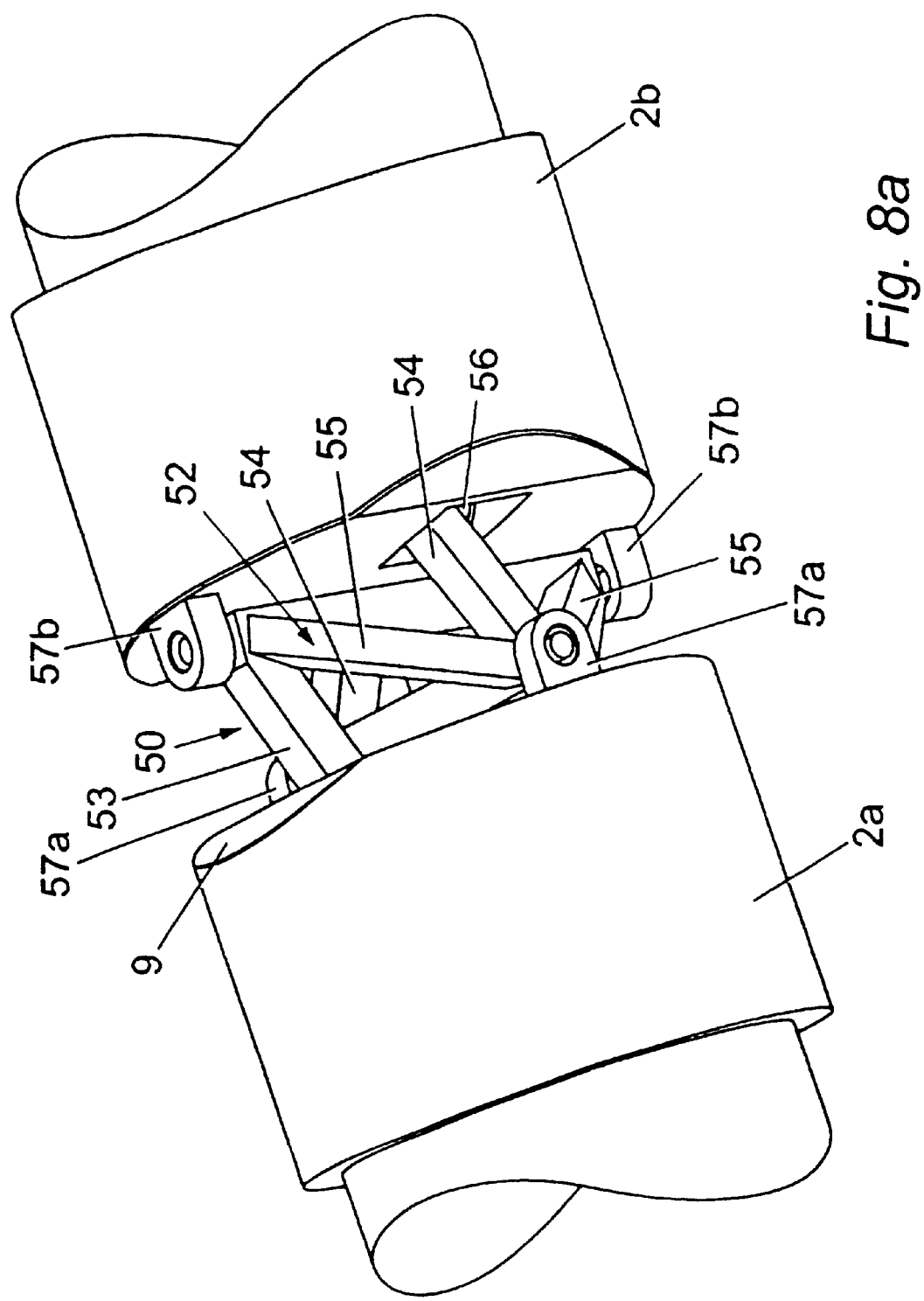
FIG. 8a is a perspective external view of an embodiment of the apparatus comprising transverse rams.
Figure 8B:
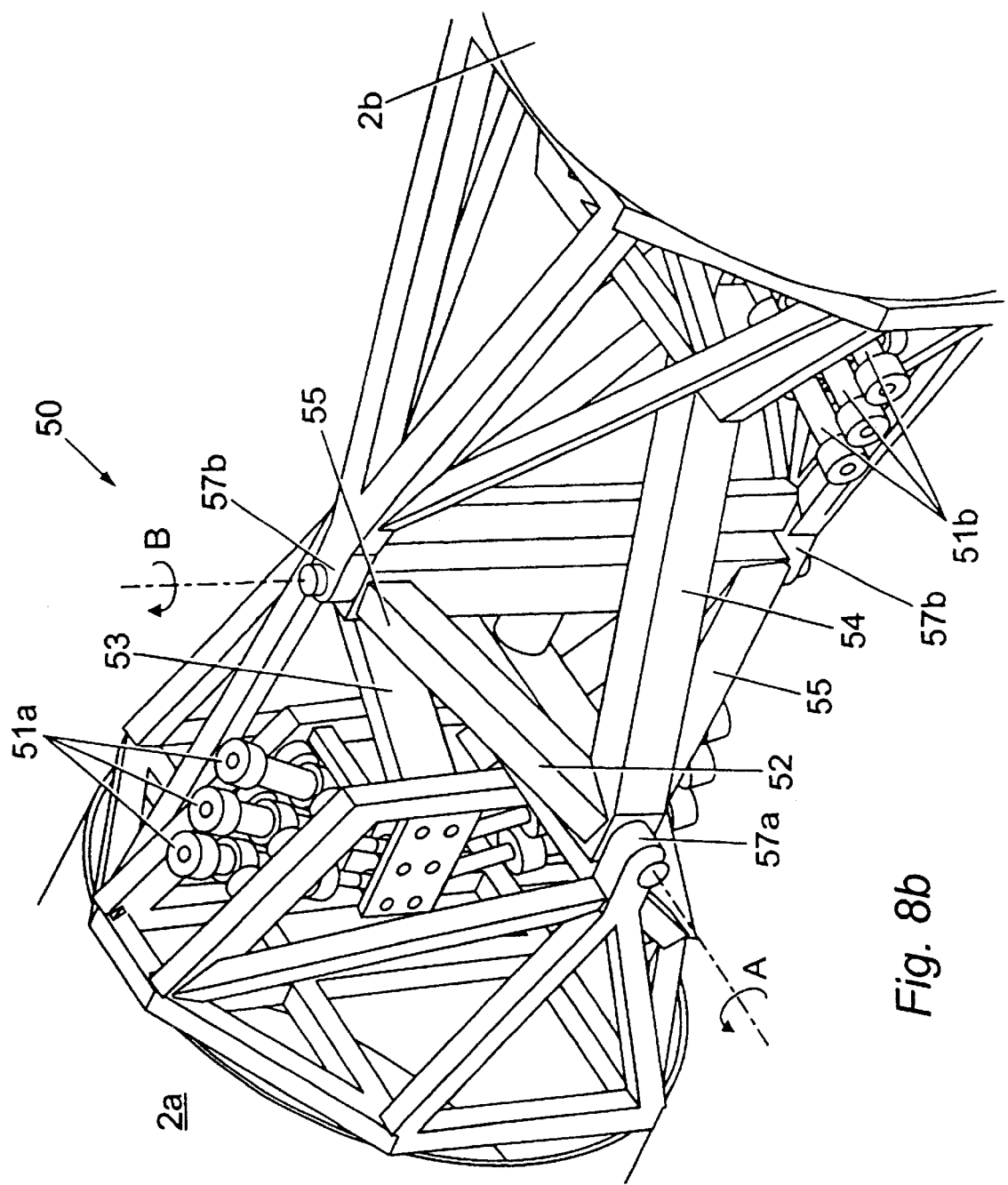

FIGS. 8a & 8b show an alternative joint configuration 50 which employs transverse rams 51. FIG. 8b is a cutaway view of the joint shown in FIG. 8a. In this configuration adjacent pairs of substantially orthogonal joints are combined in a two-degree-of-freedom or universal joint 50 having axes A and B. This joint 50 comprises a spider 52, extending in a generally vertical plane, and two triangulated lever arms 53, 54 each extending in a plane substantially perpendicular to the plane of the spider 52 and each rigidly connected to the spider 52. The spider is supported on axis A relative to the first segment 2a by hinge brackets 57a and on axis B relative to the second segment 2b by hinge brackets 57b. A first set of hydraulic rams or heave rams 51a acts to impart restraining moments to the joint through lever arm 53 about axis A. A second set of hydraulic rams or sway rams 50b acts to impart restraining moments to the joint through lever arm 54 about axis B. The rams 50a, 50b act tangentially to the lever arms 53, 54.

In one embodiment the rams 50 are external. In an alternative embodiment the rams 50 are included in sealed compartments. The compartments are sealed by flexible seals (not shown) at the exit/entry points 56 of the lever arms 53, 54.

The lever arms 53, 54 are in the form of an orthogonal pair of triangulated frames linked by diagonal braces 55 to form the joint spider.

In a possible variation, not illustrated, both lever arms 53, 54 enter the end of one segment. This allows all the hydraulic rams 51 and components to be situated in the same space.

A further alternative joint configuration employs single degree-of-freedom joints in combination with the internal or external lever arm ram configuration of the embodiment described above.

Figure 9A:
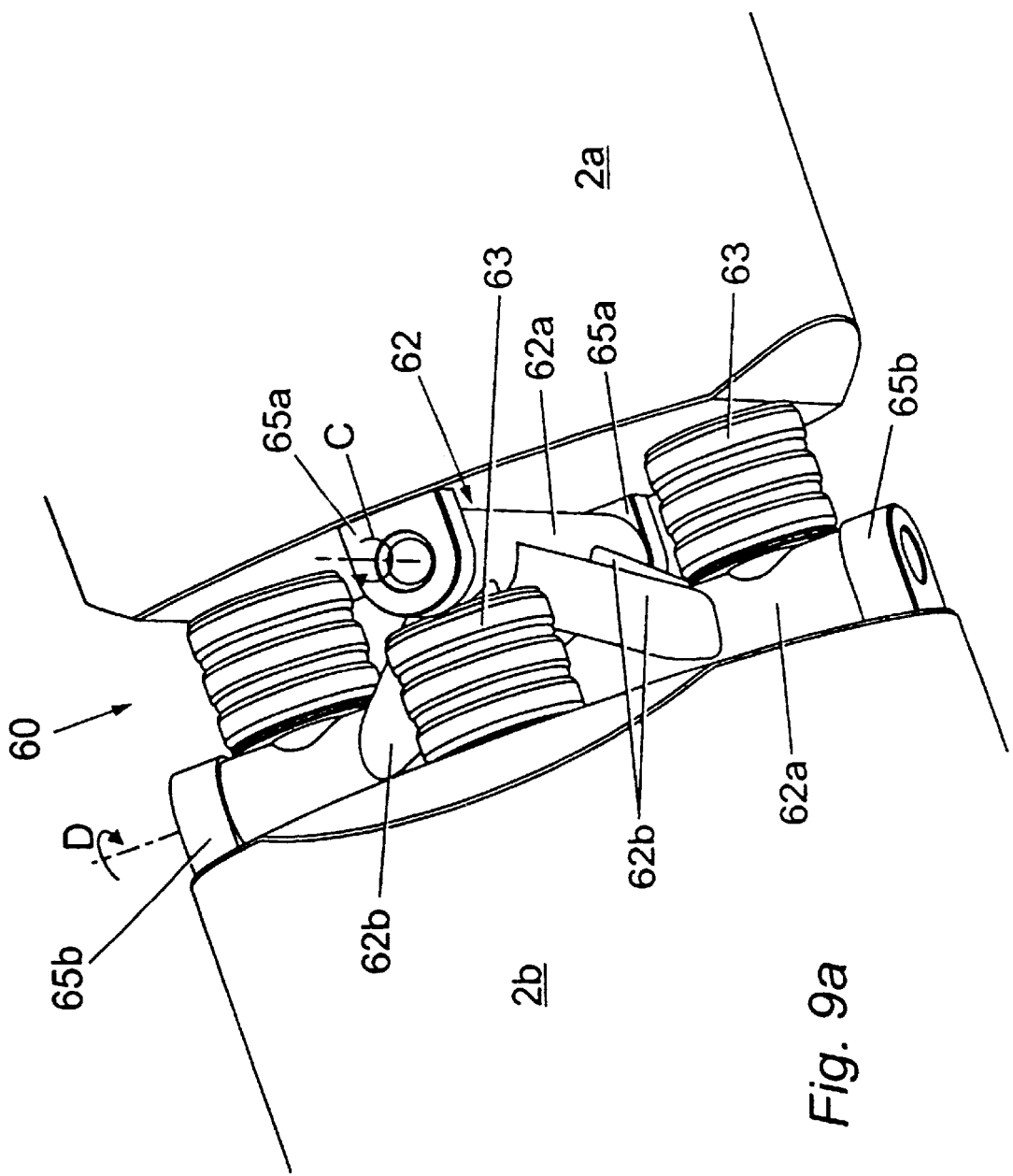
FIG. 9a is a perspective external view of an embodiment of the apparatus comprising internal in-line rams.
Figure 9B:
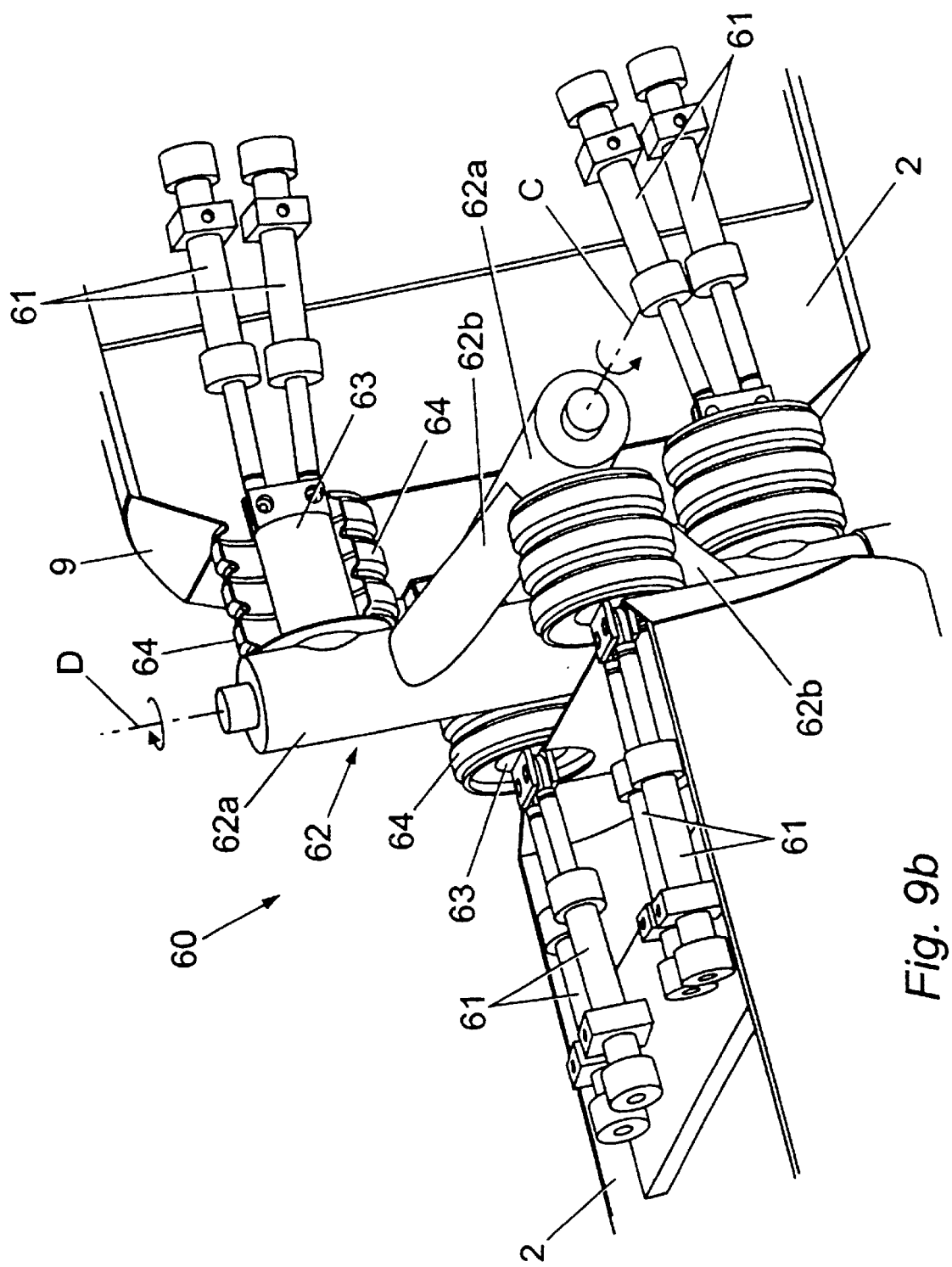

A further alternative joint configuration employs internal in-line rams. In this embodiment, adjacent pairs of substantially orthogonal joints are combined to form a 2 degree-of-freedom, or universal joint 61 having axes C and D. This embodiment, shown in FIGS. 9a and 9b, comprises hydraulic rams 61 which act in line to impart restraining moments to the joint 60 as in the embodiment of FIGS. 8a & 8b, except that joint 60 further comprises stubs 63 which protrude from the joint spider 62 through flexible bellows type seals 64 into a sealed compartment at the end of each segment, and which actuate the rams 61. The spider 62 comprises two pivot axles 62a braced by four struts 62b. The spider 62 is supported on axis C relative to the first segment 2a by hinge brackets 65a and on axis D relative to the second segment 2b by hinge brackets 65b. An alternative embodiment employs the same configuration without seals. In a further alternative embodiment (not illustrated), all the ram mount stubs 63 enter the end of one segment. This allows all hydraulic rams 61 and components to be situated in the same space. Single degree-of-freedom joints may alternatively be deployed in this configuration. In one embodiment the internal in-line rams 61 are deployed on one side of the joint axis only.

In an embodiment of the apparatus the body members incorporate areas of sacrificial structure which allow very large joint angles before the overall structural integrity or flotation of the member is compromised. These areas of sacrificial structure behave in a manner similar to crumple zone on a car.

Other components of the structure and the restraint elements can similarly be designed to fail in a benign manner which does not compromise the integrity of the complete system when necessary.

An oil/water heat exchanger is included to release excess absorbed power back into the sea. This allows the converter to continue generating at full capacity in extreme conditions. In the event of electrical grid failure, this provides the necessary thermal load.

The hydraulic oil used by the converter is specified to be biodegradable, and non-toxic to water organisms.

Figure 7:
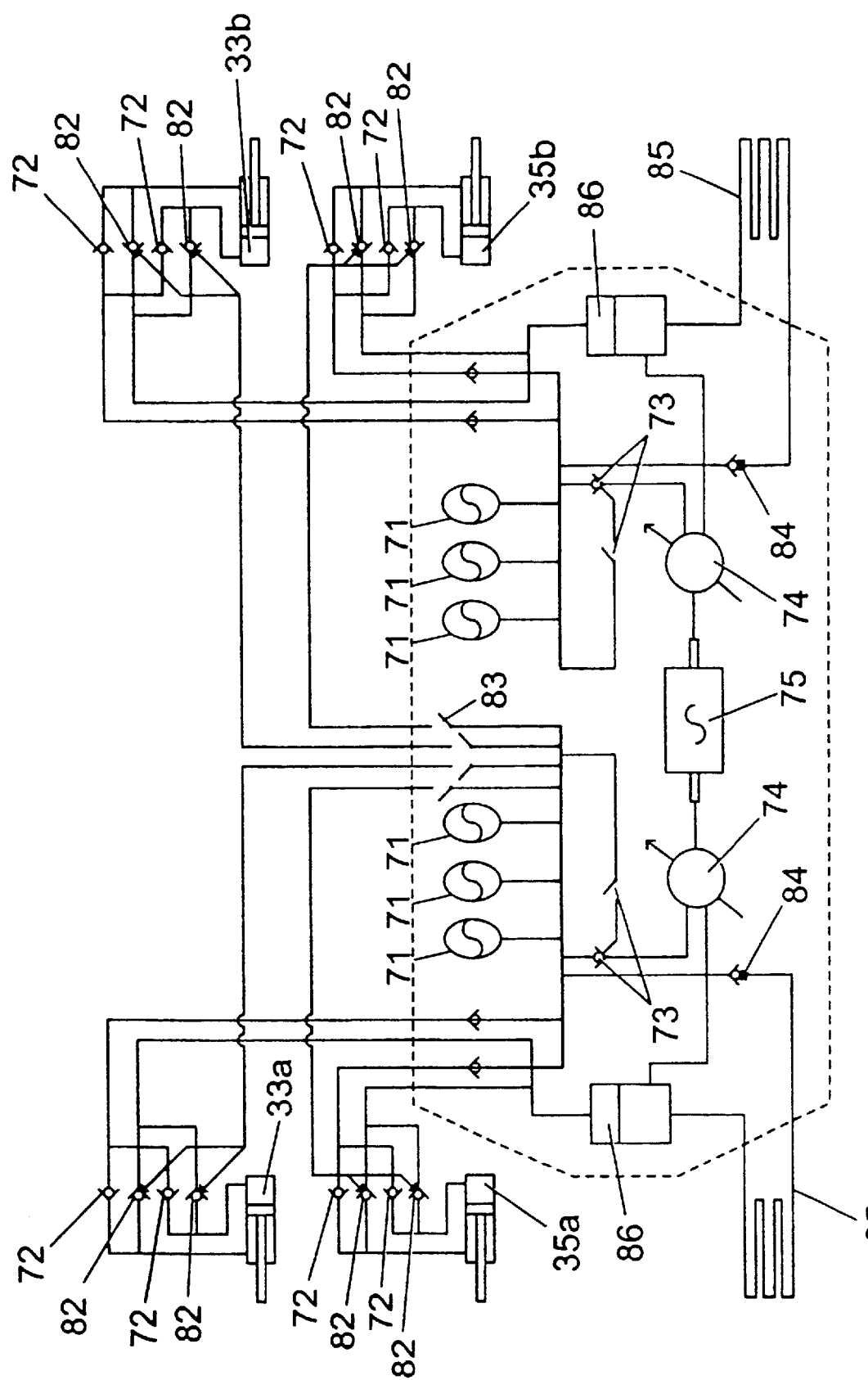
FIG. 7 is a power unit hydraulic system schematic.

FIG. 7 shows a schematic for a possible power unit serving a pair of adjacent joints 5. For optimum collection of power, the apparatus includes hydraulic accumulators 71 sized to provide adequate smoothing of the wave-by-wave input of power from each joint 5. The damping rams 33, 35 pump high pressure oil directly into the hydraulic accumulators, via piloted outlet valves 72. The high pressure oil then flows out via pilot valves 73 to variable displacement hydraulic motors 74. The motors drive an electrical generator 75.

It is to be understood that the hydraulic circuit shown is only one possible circuit. Other elements of the hydraulic circuit are piloted inlet valves 82 controlled by hydraulic switches 83 to provide constraint where required, pressure relief valves 84, heat exchangers 85, and pressurised system tanks 86, all of which are connected hydraulically in a manner which will be clear to the person skilled in the art.

In use, pressure in the hydraulic accumulators 71 is matched to the incident sea-state by controlling the rate at which oil flows through the motors. Each pair of motors is directly coupled to a separate generator 75. The generators 75 are connected directly to the grid. This system allows power to be shared between joints as required by a given sea state, and offers a high degree of redundancy in the event of a partial system failure.

Thus power is extracted directly by converting the relative motion of adjacent sections 2 into electricity. Alternatively absorbed power is used directly or indirectly to produce a useful byproduct. Examples of useful byproducts are hydrogen through electrolysis; and desalinated water.

Full control of the nature and magnitude of the damping restraint applied to each joint 5 is thus achieved by selectively enabling and/or disabling rams, and by controlling the accumulator pressure.

It can thus be seen that the relative damping applied to adjacent joints, in conjunction with selection of the roll bias angle ($\psi$), stimulates a tunable pseudo-resonant response allowing maximum power absorption from a given sea state. Control of the magnitude of the differential restraint provides a gain control which can be set in small waves to maximise efficiency of and the power extracted by the converter, and in large waves to limit the response and thus improve the survivability of the converter.

Figure 6B:
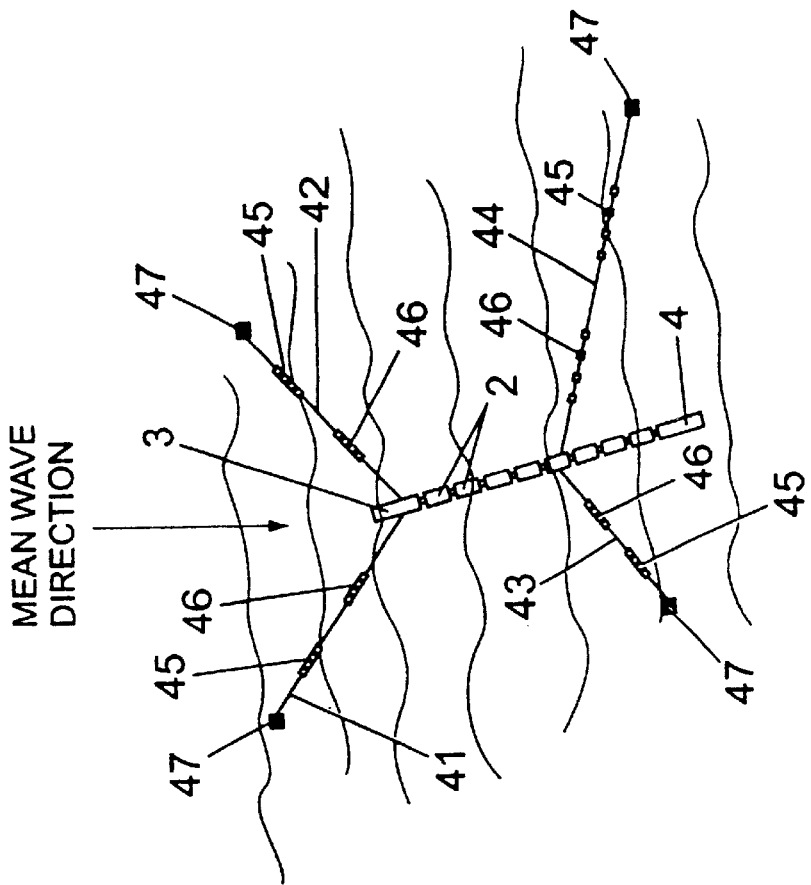
FIG. 6b is a plan view of the apparatus in situ showing the configuration of the mooring system in large extreme waves.
Figure 6A:
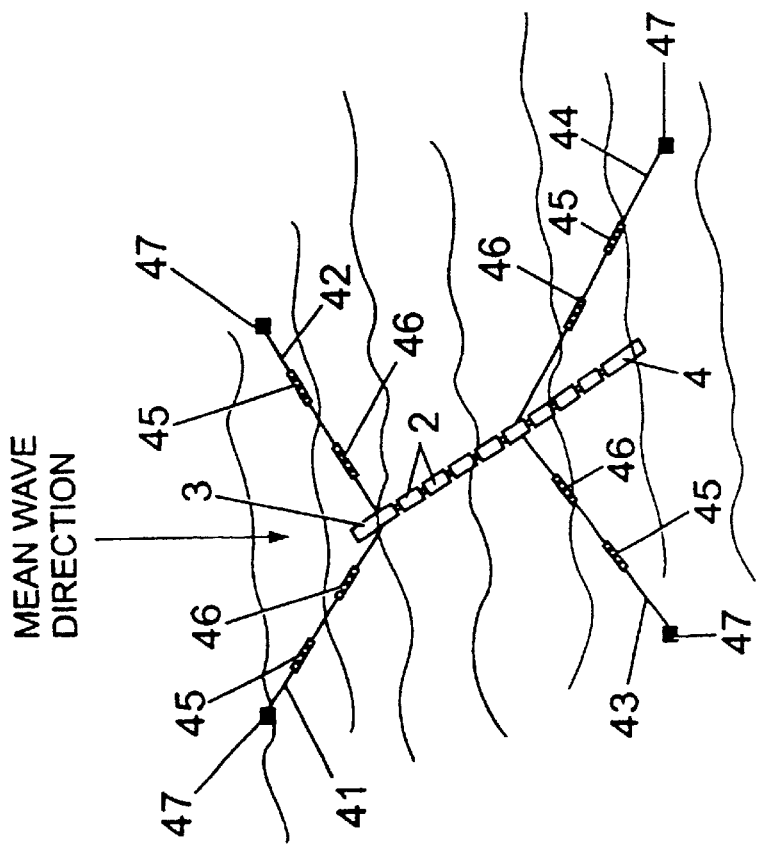
FIG. 6a is a plan view of the apparatus in situ showing the configuration of the mooring system in small low power waves.

FIGS. 6a, 6b and 6c show a possible mooring system for the converter. The mooring system is designed to restrain the structure in the correct orientation for the sea state, with appropriate compliance to accommodate extreme conditions. Four independent mooring wires 41, 42, 43, 44 are attached to the structure, two 41, 42 near the front, and two 43, 44 towards the rear. Each mooring wire 41, 42, 43, 44 has floats 45 and sinker weights 46 to provide a system with a defined stiffness. The float and sinker moorings are pre-tensioned against each other. The ends of the wires are attached to anchors 47 on the is seabed 48.

The mooring system can be designed to apply actively or passively a variable downward pull on the converter or individual segments thereof as a function of power absorbed, or the magnitude of the steady drift force caused by the incident waves. This can lead to local or global variation of the floatation level of the converter or individual segments thereof, and to earlier onset of hydrostatic 'clipping' as described above.

In small seas, power capture may be maximised by orienting the converter at an angle to the incident waves. In extreme seas it is preferable that the device be orientated end on to the incident waves. This may be achieved by using an active or passive mooring system to present the converter at an angle to the waves appropriate for maximum power capture, or appropriate for survival, as required. For the converter to be able to self-reference the converter must be presented at an angle to the mean wave front such that it spans two crests of the front.

In this embodiment the relative stiffness of the mooring wires 41, 42, 43, 44 are set up to allow the structure 1 to passively yaw in response to incident waves. The yaw angle is determined to be a function of the power absorbed by the converter. Additionally or alternatively the yaw angle determined to be a function of wave period and/or wave amplitude.

Thus, as illustrated in FIGS. 6a & 6b, in small waves when not much power is being absorbed, the converter presents a wide front to the incident waves. Conversely in large waves where the converter is running at full power, it yaws to the head on position best suited to survival in such waves.

In alternative embodiments as shown for example in FIG. 6c, the structure may be curved or zig-zagged at rest, and can comprise two-degree-of freedom joints 50, 60. A rear catenary mooring 49 may replace the rear mooring wires 43, 44.

Thus, in summary, the converter comprises a number of segments joined successively to form a chain. When deployed in waves, the coupled response of this chain is strongly influenced by:

i. the size, shape and orientation of individual segments of the chain;

ii. the relative size, shape and orientation of individual segments of the chain;

iii. the overall configuration of the assembled chain, ie linear, curved, zig-zag or otherwise;

iv. the relative size of the individual segments and the complete chain with respect to the incident wavelength and wave amplitude;

v. the relative orientation of the complete chain with respect to incident waves;

vi. the relative angles of the joints coupling neighbouring segments, orthogonal or otherwise;

vii. the roll bias angle ($\psi$);

viii. the level at which the individual segments and the complete chain floats in water;

ix. the type of restraint placed on each joint;

x. the magnitude of the resisting or exciting force applied by elements controlling the motion of each joint; and xi. the relative magnitude of resisting or exciting forces applied by the elements controlling the motion of each joint with respect to that applied to other joints in the structure.

Control of the coupled response may be effected by adjusting one or more of the above. In practice, in the preferred method, the optimum roll bias angle ($\psi$) is selected for the site in which the structure is to operate, and the structure is installed with this predetermined roll bias angle, by means of differential ballasting and/or differential mooring. The response of the structure is then varied periodically to suit the wave conditions at that particular time. If the waves are small, higher constraints may be provided against relative heave rotation than those provided against sway rotation. This encourages a cross-coupled resonant response in the sway direction along the inclined path, i.e. the axis inclined at a roll bias angle to the horizontal. In this way energy capture is maximised. If the waves are larger, similar constraints may be provided against relative heave and sway rotation, to prevent resonant motion and give a more benign sharing of the response between the two directions, sway and heave. In this way large forces and angles are avoided in heavy sea conditions.

Improvements and modifications may be made to the above without departing from the scope of the invention.

What is claimed is:

1. Apparatus for extracting power from waves, comprising a plurality of buoyant body members connected together to form an articulated structure, each pair of adjacent body members being connected to each other by a coupling member in such a way as to permit a relative rotational movement of said body members, whereby each of said coupling members comprises an element adapted to extract power from the relative rotational movement of said body members, characterised in that the apparatus further comprises:

means to apply a roll bias angle ($\psi$) to the axis of relative rotation at each coupling member away from the horizontal axis and/or vertical axis; and variable constraint means provided at each of said coupling members adapted to apply periodically varying constraint to said relative rotation of each pair of adjacent body members in response to the prevailing sea-state.

2. Apparatus according to claim 1, wherein the body members are substantially elongate and are connected together at their ends to form a chain-like structure.

3. Apparatus according to claim 2, wherein the chain-like structure has a length of the same order of magnitude as the longest wavelength of the waves from which power is extracted.

4. Apparatus according to claim 3, further comprising a slack mooring system.

5. Apparatus according to claim 4, wherein the mooring system comprises means to orientate the apparatus such that under normal operating conditions it spans at least two wave crests.

6. Apparatus according to claim 4, wherein the mooring system comprises means to vary the angle of orientation of the chain to the mean wave direction to maximise power extraction.

7. Apparatus according to claim 1, wherein the body members are substantially cylindrical.

8. Apparatus according to claim 7, wherein the body members comprise a front body member, a back body member and a plurality of intermediate body members connected together between the front and back body members, and wherein the front body member is provided with a substantially conical or truncated conical front end to minimise drag in extreme seas.

9. Apparatus according to claim 1, wherein each coupling member comprises a single degree of freedom joint and the axis of relative rotation of each joint is orientated substantially orthogonally to that of the adjacent joint.

10. Apparatus according to claim 1, wherein each coupling member comprises a universal joint allowing relative rotation of adjacent body members about two mutually orthogonal axes of rotation.

11. Apparatus according to claim 1, wherein the element adapted to resist relative rotational movement of said body members is a spring and/or damping element.

12. Apparatus according to claim 11, wherein a plurality of elements are provided and different magnitudes of constraint are applied to the substantially perpendicular pairs of joints in order to induce a cross-coupled response.

13. Apparatus according to claim 11, wherein the apparatus is provided with control means adapted to control the capacity of the apparatus to absorb power by the orientation of the joints and the differential restraint thereof.

14. Apparatus according to claim 1, wherein the apparatus is provided with a ballasting system.

15. Apparatus according to claim 14, wherein the ballasting system comprises ballast tanks comprising inlet means and outlet means, wherein said inlet means is larger than said outlet means.

16. Apparatus according to claim 14, wherein the ballasting system acts to vary the roll bias angle ($\psi$) of the chain, by the provision of asymmetric ballasting.

17. Method of extracting power from waves comprising the steps of:

deploying an apparatus comprising a plurality of buoyant body members connected together to form an articulated structure, each pair of adjacent body members being connected to each other by a coupling member in such a way as to permit relative rotational movement of said body members under action of the waves, whereby each coupling member comprises an element adapted to resist and extract power from the relative rotational movement of said body members; orientating the structure such that the front end of the structure faces into the oncoming waves; and extracting the power absorbed, characterised in that the method comprises the further steps of: applying a roll bias angle ($\psi$) to at least some of the coupling members in the articulated structure, such that the axis of relative rotation of at least some of the coupling members is skewed at a roll bias angle ($\psi$) to the horizontal; and applying a variable constraint to relative rotation of each pair of adjacent body members in order to control the dynamic response of the structure to wave action, wherein the constraint is varied periodically according to the magnitude of the waves.

18. Method according to claim 17, comprising the further step of: selecting the length of the articulated structure such that the structure is of length comparable with the longest wavelength in normal wave conditions but shorter than storm wavelengths.

19. Method according to claim 18, wherein the length of the articulated structure is selected such that in normal wave conditions the structure spans at least two wave crests.

20. Method according to claim 17, comprising the further step of: varying the yaw angle of orientation of the articulated structure to the mean wave direction so as to maximise power extraction.

21. Method according to claim 17, wherein a proportion of the coupling members permit relative rotation about a first transverse axis substantially perpendicular to the length of the structure and a proportion of the coupling members permit relative rotation about a second transverse axis orientated substantially orthogonally to the first transverse axis.

22. Method according to claim 17, comprising the further step of: selecting the roll bias angle ($\psi$) to ensure that the apparatus is orientated at an angle such that its mode of motion in the orientation at that angle is resonant with incoming waves.

23. Method according to claim 17, wherein the roll bias angle ($\psi$) is varied by asymmetrical ballasting.

24. Method according to claim 17, wherein the roll bias angle ($\psi$) is varied by mooring of the body members.

25. Method according to claim 17, wherein each coupling member comprises springs adapted to apply varying constraint to relative rotation of the adjacent body members.

26. Method according to claim 25, comprising the further step of: applying different constraints to relative rotation about the first and second transverse axes in order to induce a cross-coupled response.

27. Method according to claim 25, wherein the constrains applied to relative heave rotation about the first transverse axis are greater than the constraints applied to relative sway rotation about the second transverse axis when the amplitude of incoming waves is small, and wherein the constraints applied to relative heave rotation about the first transverse axis are of the same order as the constraints applied to relative sway rotation about the second transverse axis when the amplitude of incoming waves is large.

28. Method according to claim 17, wherein each coupling member comprises dampers adapted to apply constraint to relative rotation of the adjacent body members.

* * * * *